United States Patent [19]

Peer

[11] 3,900,572

[45] Aug. 19, 1975

[54] NUTRIENT COMPOSITION FOR PLANTS AND ANIMALS

[75] Inventor: Herbert R. Peer, Storm Lake, Iowa

[73] Assignee: Ferma-Gro Corporation, Storm Lake, Iowa

[22] Filed: Mar. 20, 1974

[21] Appl. No.: 453,177

[52] U.S. Cl. .................. 426/41; 426/42; 426/43; 426/49; 426/52; 426/53; 426/61
[51] Int. Cl. ............................................... A23c 9/12
[58] Field of Search ............ 426/41, 42, 43, 49, 52, 426/53, 54, 61; 195/100

[56] References Cited
UNITED STATES PATENTS

| | | | |
|---|---|---|---|
| 3,497,359 | 2/1970 | Peer | 426/41 X |
| 3,561,944 | 2/1971 | Battistoni et al. | 71/26 B |

*Primary Examiner*—Raymond N. Jones
*Assistant Examiner*—Esther L. Massung
*Attorney, Agent, or Firm*—Zarley, McKee, Thomte & Voorhees

[57] ABSTRACT

A nutrient composition for plants and animals which comprises in combination a cultured milk whey product innoculated with *Lactobacillus* which has been fermented in the presence of cobalt ions and kelp extract. Also, a method of making such a product which involves controlled addition of kelp extract in order to insure that kelp extract will not kill, deactivate, or otherwise retard the growth of the *Lactobacillus acidophilus* organisms during fermentation which occurs after addition of the kelp extract.

11 Claims, No Drawings

NUTRIENT COMPOSITION FOR PLANTS AND ANIMALS

BACKGROUND OF THE INVENTION

This invention relates to an improved cultured whey product formulated to include as an essential ingredient thereof kelp extract. The final product can be used as a nutrient composition for feeding plants and animals.

It has been known for sometime that the bacteria Lactobacillus has a beneficial and favorable affect upon the health of animals when inserted in their intestinal tract. It has also been known that cultured whey products innoculated with Lactobacillus acidophilus can form the basis for nutrient compositions for feeding to plants by foliar applications and the like. However, in spite of this knowledge, Lactobacillus acidophilus organisms are known to produce a high concentration of lactic acid during fermentation and this acid concentration as it increases somehow kills, stabilizes, or otherwise deactivates a major portion of the Lactobacillus acidophilus organisms. Thus, it has heretofore been quite difficult to sustain a high concentration of these bacteria in a culture for extended periods of time. This difficulty is even more pronounced with milk product solutions because in such solutions large quantities of lactic acid are produced very quickly and as a result the bacteria activity is arrested after a short period of time. This intrinsic arrestment characteristic of the bacteria made the production of cultured whey products containing substantial concentrations of live Lactobacillus acidophilus extremely difficult. This problem was substantially solved with the invention of Peer, U.S. Pat. NO. 3,497,359, which relates to the discovery that the treatment of Lactobacillus acidophilus with cobalt ions during the fermentation process causes the bacteria to somehow from a tolerance to a highly acidic environment and continue to thrive in that environment.

The invention of this application relates to an improvement over the basic invention of the heretofore mentioned patent. More and more it is becoming evident that many plants and animals have a deficiency of trace elements in their dietary intake. Trace elements, or minerals, the two terms being used herein interchangeably, refer generally to sources of copper, zinc, manganese, boron, sodium, cobalt, aluminum, iron, molybdenum, chromium, iodine, and in some cases magnesium. Proper balances of many, if not all of these trace minerals, in the dietary intake of plants and animals has been found to be of vital importance from the standpoint of producing plants which are healthy, large and capable of producing good crop yields and, with respect to animals which are healthy, large and will produce good weight yields.

In spite of the fact that the nutritional value of such trace minerals has been known for some period of time, effective feeding programs for such trace minerals in combination with cultured whey products which have been innoculated with Lactobacillus acidophilus organisms have not been developed. Difficulties have been encountered bacause the Lactobacillus acidophilus organism is very sensitive to environmental changes and the introduction of large sources of trace minerals has often decreased and in many cases totally arrested the activity of the bacteria.

Therefore, it is one of the objects of this invention to provide a cultured whey product, which product has been innoculated with Lactobacillus acidophilus organisms and fermented in the presence of cobalt ions and which contains a readily available source of trace minerals.

Another object of this invention is to provide a cultured whey product containing a readily available source of trace minerals in which the Lactobacillus acidophilus organisms present in the cultured whey product are not arrested by actively thriving to provide their normal beneficial affect on plants and animals which have been fed such products.

Still another object of this invention is to provide a method for preparing a cultured whey product which has been innoculated with Lactobacillus acidophilus organisms and which utilizes a method of incorporating trace mineral sources which does not involve arresting, stabilizing or otherwise deactivating the Lactobacillus acidophilus organisms which are present.

A still further object of this invention is to provide a nutrient composition for plants and animals which comprises cultured milk whey innoculated with Lactobacillus acidophilus organisms and fermented in the presence of cobalt ions and kelp extract which acts as a source of trace minerals.

The method and composition which accomplishes all of the heretofore stated objects will become apparent from the following detailed description of the invention.

SUMMARY OF THE INVENTION

This invention relates to a nutrient composition for plants and animals which composition comprises a cultured milk whey product innoculated with Lactobacillus acidophilus organisms and fermented in the presence of cobalt ions and as a source of trace minerals, kelp extract. In addition, the invention relates to a manner of incorporating kelp extract into the innoculated cultured milk whey product in such a manner that the kelp extract will not arrest the bacterial activity of the Lactobacillus acidophilus organism. Conducting fermentation in the presence of the kelp extract allows the kelp to function much more efficiently as a source of trace minerals than utilizing kelp extract per se. Thus, the efficiency of the kelp as a source of trace elements is greatly increased.

DETAILED DESCRIPTION OF THE INVENTION

The first steps of preparing the improved product of this invention are identical with those disclosed in my prior U.S. Pat. No. 3,497,359, patented Feb. 24, 1970, and therefore the disclosure of that application is incorporated herein by reference. However, a brief description of the preparation of cultured milk whey products which are innoculated with Lactobacillus organisms and actively fermenting in the presence of cobolt ions will be presented herein for purposes of clarity of description.

One procedure for preparing the product of my previous patent involves five separate phases or steps which are:

I. Producing a Whey Starter Microorganism.
II. Developing a Basic Culture Media.
III. Inoculating the Basic Culture Media with Starter Culture to form a Primary Culture.
IV. Adding Nutrients to the Primary Culture to form a secondary culture.

V. Final Processing and Stabilizing of the secondary culture to form a Final Base Cultured Whey Product.

The manner of preparing the formulation of this invention is identical with the description of steps (I) through (III). Trace mineral supplementation with kelp extract occurs in step IV. While the following description is given within the environment of the steps as disclosed in my previous patent application, it is to be understood that other methods of preparing an active cultured whey product which has been inoculated with *Lactobacillus acidophilus* organisms and is actively fermenting in the presence of cobalt ions, can be utilized.

Natural wheys are well known. Sources of whey include conventional dairy milk and soy milk. With specific regard to dairy milk, whey can generally be thought of as a milk serum separating as a watery liquid after milk coagulation in the making of cheese or cheese-like products. They whey which is useful in preparing the nutrient compositions of this invention is natural whey which has been inoculated with *Lactobacillus acidophilus* organisms and fermented in presence present of cobalt ions.

After inoculation of the whey product with the *Lactobacillus* organisms the whey is placed in fermenting conditions and allowed to ferment in the presence of the previously referred to cobalt ions. The source of the cobalt ions can be any convenient source such as cobalt carbonate, cobalt sulfate, cobalt lactate, cobalt chloride, cobalt acetate, and cobalt nitrate. The most preferred source of cobalt ions is cobalt carbonate. The amount of cobalt ions source used is preferably from five p.p.m. to 1,000 p.p.m. with 80 p.p.m. to 120 p.p.m. being preferred. However, other amounts of cobalt either below or below these practical ranges can be employed without departing from the spirit and scope of this invention. A brief description of steps (I) through (III) is now presented.

(I)

Producing A Whey Starter Microorganism

Step I involves the developing of a starter culture containing *Lactobacillus acidophilus* and, for example, cobalt carbonate. For example, 500 ml of skim milk can be treated with 50 milligrams of cobalt carbonate (100 p.p.m.) and sterilized by putting the solution in a flask and placing the flask in an autoclave for twenty minutes at 5 p.s.i. This sterile milk solution is then cooled to 78° F. and inoculated with 2 grams of commercial dry *Lactobacillus acidophilus* and then incubated at 100° F. for 24 hours. This starter culture is then transferred in accordance with the procedures for carrying stock cultures until a live organism density of 150 to 250 million organisms per mililiter is obtained, usually in a 24 hour period with a resulting acidity of 1.3 to 1.6 percent by weight.

This initial starter culture can then be utilized for making stock cultures by adding portions of the initial starter culture to additional skim milk samples and repeating the process. In particular, as described in the U.S. Pat. No. 3,497,359, pre-starter cultures are made from the stock culture in a like manner to that described previously herein and a "whole milk starter" is prepared by inoculating one gallon of whole milk, containing one gram of cobalt carbonate salt, with 500 mililiters of a pre-starter culture and incubating that mixture of 100° F. for 24 hours. In this manner one gallon of whole milk starter is made ready to be used in step (II).

(II)

Developing A Basic Culture Media

In this step any source of natural whey product is simply readied for use in preparing the formulation of this invention. For example, a natural whey product having a solid content of 92percent by weight, an acidity level of 5 percent, and a sugar level of 65 percent by weight, is diluted with tap water at a ratio of one part whey to 12 parts water to provide a diluted whey product having a solids level within the range of from 5 to 7 percent, acidity level within the range of from 0.2 to 0.4 percent, a sugar level of from 0.2 to 0.4 percent, and a pH within the range of from 5.5. to 6.3. Cobalt carbonate is then added to this diluted natural whey product at a level of 65 p.p.m. and ammonium hydrogen phosphate is added at a level of 400 p.p.m. in order to act as a culture nutrient.

(III)

Inoculating The Basic Culture Media With Starter Culture To Form A Primary Culture The previously described natural whey solution is heated to fermenting conditions, i.e., a temperature within the range of 95° to 105° F. and preferably 100° to 102° F. and then inoculated with a starter culture prepared as described in (I) to form a concentration of from about 1 percent to about 4 percent of the starter culture in the whey solution. This is allowed to incubate, for example, at 100° F. until the organism density of 500 to 750 million per liter and the pH is usually within the range of from 3.8 to 4.1.

(IV)

Adding Nutrients Including Trace Mineral Source (kelp extract) To The Primary Culture To Form A Secondary Culture To this point the procedure and formulation is identical with that described and claimed in my previous U.S. Pat. No. 3,497,359. However, in the nine day fermenting process described below a source of trace minerals, and in particularly kelp, is gradually added to the fermenting culture media so that fermentation occurs in the presence of both the cobalt ions and the kelp extract.

Kelp is a well known large brown seaweed of the family Laminariaceae. Kelp is a well known source of the previously mentioned trace minerals as well as others. Kelp is readily commercially available and is particularly available as a concentrated and dried kelp extract. It is generally prepared by drying kelp, size reducing the dried kelp to a meal form, and extracting the meal to make an extract which is concentrated and dried. Concentrated and dried extract is very hygroscopic and readily soluble in water. The kelp is added, in the form of water solution, to the fermenting culture. However, care must be exercised in adding the kelp extract, both in terms of rate of addition and concentration of the kelp extract, in order to not kill, arrest, or otherwise deactivate the *Lactobacillus acidophilus* bacteria and prevent further fermentation. It has been found that an excessively dilute kelp extract must be added since the kelp itself is not a sterile media and if too dilute will start its own auto fermentation process and develop side strains of undesired bacteria. The kelp extract must, however, be sufficiently diluted with water in order to be in a readily pourable condition for ease of handling in the process. Preferably, the kelp extract is a 25 to 35 percent, and most preferably 25 to 30 percent by weight solution of the concentrated and dried kelp extract. Addition levels within this range of concentrations will allow the pH to be maintained at 4.3 or less. This is important since it has been found that the kelp extract is generally of a basic pH and addition at a rate which will allow the pH of the fermenting culture to exceed 4.3 will retard the fermenting process.

Care must also be exercised in the timing of addition of the previously described kelp extract, since if the extract is added when the organism density of the fermenting culture is too low the kelp extract will somehow retard the continued growth of the organism and the fermenting process. It has been found that the kelp extract can be safely added when the fermenting culture has reached an organism density of at least one billion per mililiter.

Commercially available kelp extracts are manufactured utilizing both acid and alkaline extraction techniques. Because of the variance in these techniques, it has been found to be preferable to employ an initial kelp extract pre-treatment step. When this is done the kelp extract is standardized eliminating further processing variability.

In particular, with kelp extracts which are of alkaline pH, upon exposure to lactic acid, brown gaseous fumes of nitric oxides are released. This evolved gas if present during fermentation will retard the fermenting effects of the lactobacillus organism.

In the pre-treatment step, the kelp extract slurry is initially treated with from 3% to 3.5% by weight of lactic acid. This treatment produces kelp slurry with a pH within a range of about 6 to about 6.2 and expels any potential nitric oxides prior to the fermentation.

The most preferred final level of kelp in the formulation is 3.25 percent on a dry weight basis but can generally vary within the range of from 2.0 to 5.0 percent with 2.5 to 3.5 percent being preferred.

While not wishing to be bound by any theory, it is believed that the kelp extract when so added to the fermenting culture as described above acts as a nutrient for the *Lactobacillus acidophilus* organisms and in some manner may be incorporated into the organism. In any event, this culture which comprises cultured whey inoculated with *Lactobacillus acidophilus* organisms and fermented in the presence of cobalt ions and kelp extract provides a nutrient which can be utilized in a foliar spray and as a soil enricher, in liquid form, to provide plants which germinate earlier, grow larger and produce greater crop yields. In addition, this nutritional supplement can be successfully fed to livestock to provide a readily available source of *Lactobacillus acidoph-*

*ilus* bacteria for their intestinal tract and to provide a source of readily ingestable and utilizable trace elements for proper dietary balance of the animals. The result is livestock which are healthier, more resistant to disease susceptibility, and generally gain weight faster.

If desired, the culture which is prepared as described above can be utilized for final processing and stabilizing in accord with (V) heretofore mentioned and in accord with the procedure described in detail in my previous U.S. Pat. No. 3,497,359. The following example is offered to illustrate but not limit the invention disclosed hrein.

EXAMPLE

A primary culture is prepared as described in I – III above. The Base culture comprised 704 gallons of water, 300 pounds of dried whey as described in (II) above, 1000 grams of ammonium acid phosphate and 120 grams of cobalt carbonate. The pH was 6.3. The base culture was inoculated with 76,000 ml. of whole milk starter culture (II) above, which had a pH of 3.55, an acidity level of 1.5 percent by weight and a *Lactobacillus acidophilus* organism density of 900 million ml.

A kelp extract was prepared by mixing 324 pounds of dry kelp extract and 75 gallons of hot (110° F.) water to provide 98 gallons of kelp extract solution having a pH of 8.0, and a 33 percent by weight kelp solution. This kelp solution was subjected to an initial lactic acid pretreatment to eliminate the possibility of undesired nitric oxide evolution. The lactic acid was 4.5 liters of an 88 percent grade acid. The acid and kelp extract were mixed until all evolution of gas subsided. This kelp extract solution was pourable and easy to handle and not sufficiently concentrated to provide excessive alkalinity and thereby retard fermentation, and showed no evidence of development of side strains of bacteria during the below described fermentation procedure.

In addition another dry mixture comprising 120 grams of cobalt carbonate, 1000 grams of ammonium acid phosphate and 100 pounds of dried whey was prepared. This mixture was added at times indicated below to provide a nutrient mixture for the fermentation. Ammonium hydroxide solution was also added as indicated below to provide an additional nutrient. The concentration of the ammonium hydroxide was a 26 ° Baume solution.

In the table below "kelp" refers to the above described kelp solution and the number immediately thereafter in parenthesis indicates the gallons added, the same is true for the ammonium hydroxide. The dry mix nutrient is indicated as "dry mix" and unless indicated otherwise has the formulation specified above. The number in parenthesis behind dry mix indicates the number of "units" having the above formulation added during the period.

| Day | Temp. ° F. | % Acidity | Organism Density | Material Added & Amount |
|---|---|---|---|---|
| 0 | | | | Start |
| I 24 hrs. | 100 | .6 to .8 | — | Dry mix (2) NH$_4$OH(4) |
| II 48 hrs. | 102 to 104 | 1.4 to 1.6 | 350×10$^6$/ml | dry mix (2) NH$_4$OH(4) Kelp (3) |
| III 72 hrs. | 102 | 2.0 to 2.2 | 1×10$^{9}$/ml | dry mix (3) * NH$_4$OH(4) Kelp (6) |

CONTINUED

| Day | Temp. °F. | % Acidity | Organism Density | Material Added & Amount |
| --- | --- | --- | --- | --- |
| IV 96 hrs. | 100 to 102 | 2.4 to 2.6 | $1.4 \times 10^9$/ml | dry mix(2) NH₄OH(2) Kelp (8) |
| V 120 hrs. | 102 | 3.0 to 3.2 | $1.5 \times 10^9$/ml | dry mix (2) NH₄OH(1) Kelp (10) |
| VI 144 hrs. | 100 | 3.2 to 3.4 | $1.5 \times 10^9$/ml | dry mix(2) * NH₄OH(1) Kelp (20) |
| VII 168 hrs. | 100 to 101 | 3.4 to 3.6 | $1.5 \times 10^9$/ml | dry mix(2) * kelp (25) |
| VIII 192 hrs. | 101 | 3.4 to 3.6 | $1.75 \times 10^9$/ml | dry mix (2)** Kelp (30) |
| IX 212 hrs. | 100 | 3.4 to 3.6 | $1.8 \times 10^9$/ml | Finish |

* dry mix as described but with CoCO₃ deleted - number of astericks refers to number of units added with changed formulation. The kelp extract solution was added only when the percent acidity fell within the range expressed in the table. All of the materials were added on an incremental basis over an 8 hr. working day. This technique, and especially the addition of the kelp extract only when the acidity was within the expressed ranges, greatly helped to maintain the pH below 4.3 during the fermentation process.

After 9 days the finished culture was stablized by adding six pounds of cobalt carbonate, 12.5 pounds of ferrous lactate, and 110 gallons of lactic acid (85% – 88% grade lactic acid). The result was a liquid product suitable for direct foliar application and liquid feed supplementation for animals. Plants and animals receiving the nutritional supplement described herein thrived well and resulted in higher yields than animals receiving either a kelp extract along or the fermentation product of U.S. Pat. No. 3,497,359 alone.

While the foregoing description and example have been presented with continuing reference to fermenting in the presence of kelp extract and cobalt ions, it is to be understood that this is a highly preferred embodiment offering the advantages heretofore mentioned. Still, one can ferment in the presence of kelp extract only and still retain many of the beneficial results of this invention. Of course, if the kelp extract is itself rich in cobalt, the extract can also function as a source of cobalt ions.

The fermentation process described in this example was completed over a nine day period at which time culture equilibrium has been attained. Culture equilibrium refers to the desired end point of a fermenting reaction as measured by organism density per milliliter, pH, percent acidity and other measurable data. For the cultures described herein culture equilibrium is attained when the pH is within the range of 4.2 to 4.4 preferably within the range of 4.25 to 4.35; the organism density is within the range of 1.5 billion to 2 billion per ml. and the percent acidity is within the range of from 3.3 to 3.6 percent and preferably 3.35 to about 3.55 percent.

What is claimed is:

1. A nutrient composition for plants and animals which comprises a cultured whey product inoculated with *Lactobacillus* organisms and fermented in the presence of kelp extract the organism density of said *Lactobacillus* organisms being at least one billion per milliliter when said kelp extract is added and the concentration of said extract during fermentation being 25 to 35 percent solubles, said composition having been maintained at fermenting conditions until the organism density is within the range of from 1.5 billion to about 2.0 billion per milliliter, and the pH of said composition is 4.3 or less.

2. The composition of claim 1 which has been fermented in the presence of kelp extract and cobalt ions.

3. The composition of claim 2 wherein said *Lactobacillus* organisms are *Lactobacillus acidophilus*.

4. The composition of claim 2 wherein the source of cobalt ions is cobalt carbonate.

5. The composition of claim 4 wherein the amount of cobalt carbonate is from about 5 p.p.m. to about 1000 p.p.m.

6. The composition of claim 5 wherein the amount of cobalt carbonate is from about 80 p.p.m. to about 120 p.p.m.

7. The composition of claim 1 wherein fermenting occurred at a temperature of from about 95° to about 105° F.

8. The composition of claim 7 wherein fermenting occurred at a temperature of from about 100° to about 102° F.

9. The composition of claim 1 wherein the said composition, on a dry weight basis comprises from about 2.0 to about 5.0 percent of kelp.

10. The composition of claim 9 wherein said composition comprises from about 2.5 to about 3.5 percent of kelp.

11. A method of making a nutrient composition for plants and animals, said method comprising,
preparing a base culture comprising whey inoculated with *Lactobacillus acidiphilus* organisms
fermenting said base culture until an organism density of at least one billion/milliliter is attained,
adding kelp extract having a concentration of from about 25 percent solubles to about 35 percent solubles to said base culture, the rate of addition being such that the pH never exceeds 4.3;
periodically adding to the fermenting culture, a nutrient composition therefor comprising a cobalt salt and ammonium acid phosphate; and
maintaining said fermenting base culture at fermenting conditions until the organism density is within the range of from about 1.5 billion to about 2.0 billion ml, and the pH is within the range of from about 4.2 to about 4.4 and the percent acidity is within the range of from 3.35 to 3.55 percent.

* * * * *